United States Patent [19]

Biddulph

[11] Patent Number: 4,543,227

[45] Date of Patent: Sep. 24, 1985

[54] METHOD OF TREATING REFRACTORY BORIDE SHAPES

[75] Inventor: Richard H. Biddulph, Surrey, England

[73] Assignee: United States Borax & Chemical Corporation, Los Angeles, Calif.

[21] Appl. No.: 592,200

[22] Filed: Mar. 22, 1984

[30] Foreign Application Priority Data

Mar. 28, 1983 [GB] United Kingdom ............... 8308478

[51] Int. Cl.$^4$ .................................... C04B 35/60
[52] U.S. Cl. ................................. 264/233; 264/332; 264/344; 423/84
[58] Field of Search ............... 264/332, 344; 423/84, 423/233

[56] References Cited

U.S. PATENT DOCUMENTS 2,913,312 11/1959 Dubeck .................................. 423/84
3,329,513 7/1967 Murata et al. ...................... 264/332

FOREIGN PATENT DOCUMENTS 42-18322 9/1967 Japan .................................. 264/344

Primary Examiner—James Derrington
Attorney, Agent, or Firm—James R. Thornton

[57] ABSTRACT

Hot pressed refractory boride shapes are treated with molten alkali metal hydroxide such as by immersion in a bath of the molten hydroxide. The treatment cleans and removes residual carbon from the surface layer of the shapes.

7 Claims, No Drawings

METHOD OF TREATING REFRACTORY BORIDE SHAPES

This invention relates to the preparation of refractory boride shapes which show improved resistance when brought into contact with materials such as molten metals or cryolite as found in alumina reduction cells.

BACKGROUND OF THE INVENTION

Aluminum metal is prepared electrolytically by the reduction of alumina. Conventional alumina reduction cells comprise a vessel having a refractory lining containing, as molten electrolyte, alumina dissolved in fused cryolite. The floor of the cell or vessel typically serves as part of the cathode. At least one anode is disposed within the vessel spaced apart from the cathode. Upon the passage of an electric current between anode and cathode, aluminum is formed by electrolytic reduction of the alumina. The resultant molten aluminum is denser than the cryolite electrolyte and collects as a pool of metal on the floor of the cell.

U.S. Defensive Publication No. T993,002 (Kaplan et al—issued Apr. 1, 1980) discloses the use of a titanium diboride surface to contact molten aluminum at the bottom of an alumina reduction cell. The titanium diboride surface is provided by refractory tiles secured to a carbonaceous substrate. The tiles are stated to be wettable by molten aluminum and to be chemically inert under the conditions of the electrolyte process.

Typically, refractory boride shapes are manufactured by hot pressing in graphite dies at pressures of about $1.5-3.0 \times 10^7$ Pa and temperatures of 2000°–2050° C. for approximately two hours. On removal from the die and brushing to remove adhering graphite, the hot pressed shape has a grey and rough appearnace.

It has been shown that the surface of the refractory is rich in carbon which is present in all hot pressings made in graphite or carbon dies. When placed in an environment such as that disclosed in the Kaplan et al Defensive Publication, it has become evident that the presence of the carbon-rich surface layer has a deleterious effect on the life of a pressing when brought into contact with molten aluminum. Cracks can start in the surface layer and propagate throughout the hot pressed shape.

Previously it has been proposed that the carbon-rich surface layer should be removed mechanically, such as by diamond grinding. However, this process is very expensive and time consuming since; for example, to remove 1 mm. from all of the surfaces of a titanium diboride plate 250 mm. square by 25 mm. thick, may take about 30 hours.

It has now been found that the surface layer can be removed effectively by alternative means which are both more economical and can be completed in a much shorter time.

DESCRIPTION OF THE INVENTION

According to the present invention, a refractory boride shape, particularly a titanium diboride refractory, which has been formed by hot pressing in a graphite or carbon die and has a carbon-rich surface layer is immersed in a bath of molten alkali metal hydroxide for a period of time sufficient to remove the carbon-rich surface layer. The exact time of treatment in the bath is not critical, but will depend on the temperature of the bath and also to some extent on the purity of the refractory boride. After remove from the bath the shape is cooled and washed with hot water.

The preferred alkali metal hydroxide is sodium hydroxide for economic reasons, which is heated typically to about 350°–400° C. for use in this invention. However, a sodium-potassium hydroxide eutectic may also be used as it reacts with the surface layer of the refractory boride layer at a lower temperature.

Before the refractory shape is immersed in the treatment bath it preferably is brushed to remove adhering carbon and preferably also is pre-heated sufficiently (say to about 400° C.) to avoid undue thermal shock upon immersion in the bath.

The invention is further illustrated by the following Example.

EXAMPLE

A hot pressed titanium diboride tile having an average thickness of 1.059 inches (2.690 cm.) was heated to 400° C. and immersed in a bath of molten sodium hydroxide at 350°–370° C. for 1 hour and for a further 0.5 hour at 400° C.

The tile was removed, allowed to cool to about 100° C. and washed with hot water until all the adhering sodium hydroxide had been removed.

The tile was dried and found to have a surface finish which was smooth and metallic looking. Microscopic examination showed that the carbon-rich surface layer had been completely removed. Measurement of the thickness of the tile after treatment showed that it had reduced to 0.979 inches (2.487 cm.).

Various changes and modifications of the invention can be made, and to the extent that such variations incorporate the spirit of this invention, they are intended to be included within the scope of the appended claims.

What is claimed is:

1. In the method for forming titanium diboride shapes by hot pressing said diboride in a carbon containing die, the improvement which comprises treating said formed shape with molten alkali metal hydroxide, thereby removing the carbon-rich surface layer therefrom.

2. The method according to claim 1 in which said formed shape is treated by immersion in a bath of said alkali metal hydroxide.

3. The method according to claim 1 in which said alkali metal hydroxide is sodium hydroxide.

4. The method according to claim 2 in which said bath is sodium hydroxide at a temperature of about 350° to 400° C.

5. The method according to claim 2 in which said titanium diboride is brushed to remove adhering carbon prior to immersion in said bath.

6. The method according to claim 2 in which said titanium diboride is preheated to about 400° C. prior to immersion in said bath.

7. The method according to claim 1 in which said alkali metal hydroxide is a sodium-potassium hydroxide eutectic.

* * * * *